United States Patent
Begley et al.

(10) Patent No.: US 6,252,843 B1
(45) Date of Patent: Jun. 26, 2001

(54) AUTOMATIC CLAMPING OF COMPACT DISCS

(75) Inventors: Paul V. Begley; Gregory A. Standiford; Charles R. Weirauch, all of Loveland, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/289,504

(22) Filed: Apr. 9, 1999

(51) Int. Cl.[7] .................................................. G11B 23/00
(52) U.S. Cl. .............................................................. 369/271
(58) Field of Search ..................................... 369/270, 271, 369/282, 264

(56) References Cited

U.S. PATENT DOCUMENTS

| 4,125,883 | 11/1978 | Rolph | 360/99 |
|---|---|---|---|
| 4,215,535 | 8/1980 | Lewis | 60/736 |
| 4,218,065 | 8/1980 | van der Hoek et al. | 274/9 R |
| 4,408,839 | 10/1983 | Wiener-Avnear | 350/347 |
| 4,535,255 | 8/1985 | Ochii et al. | 307/548 |
| 4,809,255 | 2/1989 | Johannes | 369/270 |
| 5,014,143 | 5/1991 | Mori et al. | 360/99.12 |
| 5,555,233 | 9/1996 | Yano et al. | 369/270 |
| 5,590,004 | * 12/1996 | Boutaghou | 369/271 |
| 5,610,300 | 3/1997 | Altmann et al. | 544/244 |
| 5,682,278 | * 10/1997 | Koseki et al. | 369/271 |
| 5,889,757 | * 3/1999 | Mori et al. | 369/271 |

FOREIGN PATENT DOCUMENTS

| 3401007 | * 7/1984 | (DE) | 369/271 |
|---|---|---|---|
| 0030754 | 6/1981 | (EP) . | |
| 58-155585 | 9/1983 | (JP) . | |
| 58-177579 | 10/1983 | (JP) . | |
| WO8700673 | 1/1987 | (WO) . | |
| WO9623594 | 8/1996 | (WO) . | |

* cited by examiner

*Primary Examiner*—Allen T. Cao

(57) ABSTRACT

The present invention relates to a method and apparatus for automatically clamping a compact optical disc, or the like. The invention comprises a first contact surface and a second contact surface. Loading a disc into a disc player brings the contact surfaces into contact, which actuates a clamp. Unloading the disc separates the contact surfaces, which releases the clamp. The contact may be caused by relative motion between the contact surfaces.

25 Claims, 6 Drawing Sheets

AUTOMATIC CLAMPING OF COMPACT DISCS

BACKGROUND

This invention relates to devices for recording, testing, and playing information carrying discs, particularly to the disc positioning, holding, or clamping features and methods associated with such devices; frictional turntables; vibration damping members; and self balancing mechanisms. More particularly, the invention relates to a method and apparatus for automatically clamping compact optical discs.

Optical discs, commonly known as compact discs (CD or CD-ROM) or Digital-Video Discs (DVD or Divx), are an inexpensive and reliable data storage medium. The discs are generally used in conjunction with a playback device (CD player) that rotates the discs on a turntable. In order to allow the CD player to function satisfactorily, it is important to properly locate and securely clamp the disc to the turntable.

Some CD players use spring loaded balls or fingers to clamp the disc against the turntable. The balls or fingers are generally located in a center hub and move in a radial direction relative to the disc's axis of rotation. A spring forces the balls or fingers radially outward with sufficient force to hold the disc against the turntable.

A user wishing to load this type of CD player first places the disc over the hub so that the disc rests on the balls or fingers. The user than applies a downward force to the disc. This downward force biases the balls or fingers in a radially inward direction, which decreases the distance between opposing balls and allows the disc to drop onto the turntable. The spring then returns the balls or fingers to their original position, where they press against the top edge of the disc's center-hole. A user wishing to unload this type of player must pull the disc off the turntable with sufficient force to bias the balls or fingers back into the hub. Once the disk is removed, the spring returns the balls or fingers to their original position.

One of the problems associated with this type of clamping mechanism is the force required to load and unload a disc. The loading and unloading forces cause the disc to flex, which may result in permanent damage. This problem is particularly common when using laminated DVD discs. In addition, users may apply the loading and unloading force in the wrong direction or in a non-uniform fashion. This can cause disc misalignment and damage the CD player. Therefore, there is a need for an improved clamping method that does not require a significant force to load or unload the disc.

Another problem, related to the force required to load and unload the disc, is that users often need to touch the underside of the disk to exert the necessary force. This touch leaves fingerprints on the data storage surface, which can cause the player to incorrectly read the stored information. Yet another problem with this type of clamping mechanism is its complexity for the user. Preferably, a user should be able to drop or insert a disc into the CD player and activate the unit. Therefore, there is also a need for a simple clamp that users can operate conveniently and quickly.

One partial solution to the above-noted problems is called tray loading. CD players using this method generally clamp the disc between a magnet and a steel clamp plate. A cam within the drive mechanism pushes the magnet and the disc into contact with the steel clamp plate. This design, however, is complex and requires significant precision. This design may also cause stray magnetic fields that can disturb the operation of other devices in and around the player. Finally, this design does not tolerate large variations in disc dimensions, and does not always accurately control the force applied to the disc.

Another partial solution is described in U.S. Pat. No. 4,215,535 (Denton). The Denton patent describes a mechanism that uses centripetal force to actuate a clamping device. In particular, clamping members are attached to a turntable and mounted so that they swing radially outward as the turntable accelerates. However, the mechanism cannot provide clamping force at slow speeds, requires a complex interaction between parts, and demands significant manufacturing precision.

U.S. Pat. No. 4,535,255 (Van Alem et al.) describes a compliant clamping mechanism actuated by a continuous spiral spring. The spring forces rollers down a conical surface, which pushes a pressure member against a disc. This mechanism, however, may lose clamping force at high RPM because a centripetal force on the rollers can counteract the spring's force. The clamping force in the Van Alem et al. mechanism may also vary due to thermal expansion and creep in the spring.

U.S. Pat. No. 4,408,839 (Guzik et al.), U.S. Pat. No. 5,014,143 (Mori et al.), and U.S. Pat. No. 5,610,300 (Yamashita et al.) disclose the use of a conical surface to push pressure members against a disc. The conical surface in all three patents is raised and lowered by a rod connected to an external actuator. This actuator, however, requires additional parts and increases manufacturing cost. The actuator must also interact with the turntable shaft, which requires relatively precise tolerances for correct operation.

U.S. Pat. No. 5,555,233 (Yano et al.) discloses a disk clamping device having an operation button. A user wishing to load a disk first rests the disc on a plurality of balls that project from a hub. The user then presses the operation button. This releases a radially outward directed force on the balls, which allows the balls to move radially inward and permits the disc to drop to the turntable. The user then releases the operation button. This restores the radial outward force pushing the balls against the disc. A user wishing to unload the disc must simultaneously depress the operation button to release the balls and lift the disc. Thus, Yano et al. require the user perform several steps to load a disc, which increases complexity and cycle time. Yano et al. also require the user to perform two simultaneous actions to unload the disc. Many users may find this maneuver awkward and time consuming.

Clearly, there is a need for a simple, inexpensive disc clamping mechanism that automatically clamps, holds, and releases a disc as a result of normal disc loading and unloading operations.

SUMMARY

The present invention provides an apparatus and method for automatically clamping, holding, and releasing a disc in a disc player, or the like, during normal disc loading and unloading operations. In one embodiment, the invention comprises a disc receiving structure and a clamp configured to be actuated by contact between the disc receiving structure and the disc playing device. The contact may be caused by relative motion between the disc receiving structure and the disc playing device. Embodiments of this invention can be configured for use in a variety of disc recording, testing, and clamping devices, including laptop style CD players, top loading CD players, and front loading CD players.

Another embodiment of the invention comprises the step of providing first and second contact surfaces associated with a disc player. Loading a disc brings the contact surfaces into contact, which causes the disc clamping assembly to clamp a disc. Unloading the disc separates the contact surfaces, which causes the disc clamping assembly to release the disc.

One aspect of this invention is a hub housing that contains a plurality of clamping member and a biasing member. The hub housing engages the disc's interior edge as the disc is loaded into the player, which aligns the disc with the turntable's axis of rotation. When a force is applied to the contact surface, the biasing member causes at least one clamping member to engage the top corner of the disc's center hole. The clamping member securely holds the disc against a rotatable surface, such as a turntable. The hub housing may also contain a releasing member that disengages the clamping members from the disc when the force is removed from the contact surface.

One feature and advantage of the present invention is that secure locking of a disc to a turntable or the like is accomplished without requiring a user to do more than normally load and unload a disc into the disc player. This and other features, aspects, and advantages of the present invention will become better understood with reference to the following description, appended claims, and accompanying drawings.

DETAILED DESCRIPTION

The accompanying figures and this description depict and describe embodiments of the present invention, and features and components thereof. Like numerals in the various embodiments will refer to like parts. With regard to means for fastening, mounting, attaching or connecting the components of the present invention to form the mechanism as a whole, unless specifically described otherwise, such means are intended to encompass conventional fasteners such as machine screws, nut and bolt connectors, machine threaded connectors, snap rings, screw clamps, rivets, nuts and bolts, toggles, pins and the like. Components may also be connected by welding, friction fitting or deformation, if appropriate. Electrical connections or position sensing components may be made using appropriate electrical components and connection methods, including conventional components and connectors. Unless specifically otherwise disclosed or taught, materials for making components of the present invention are selected from appropriate materials such as metal, metallic alloys, fibers, plastics and the like, and appropriate manufacturing or production methods including casting, extruding, molding and machining may be used.

Any references to front and back, right and left, top and bottom and upper and lower are intended for convenience of description, not to limit the present invention or its components to any one positional or spacial orientation.

Furthermore, the term "player" in this description is intended to include any device used in conjunction with any type of information carrying disc. The term specifically includes, without being limited to, devices used to: read information from discs, record information to discs, both read and record information on discs, manufacture discs, or test discs.

Figure 1:
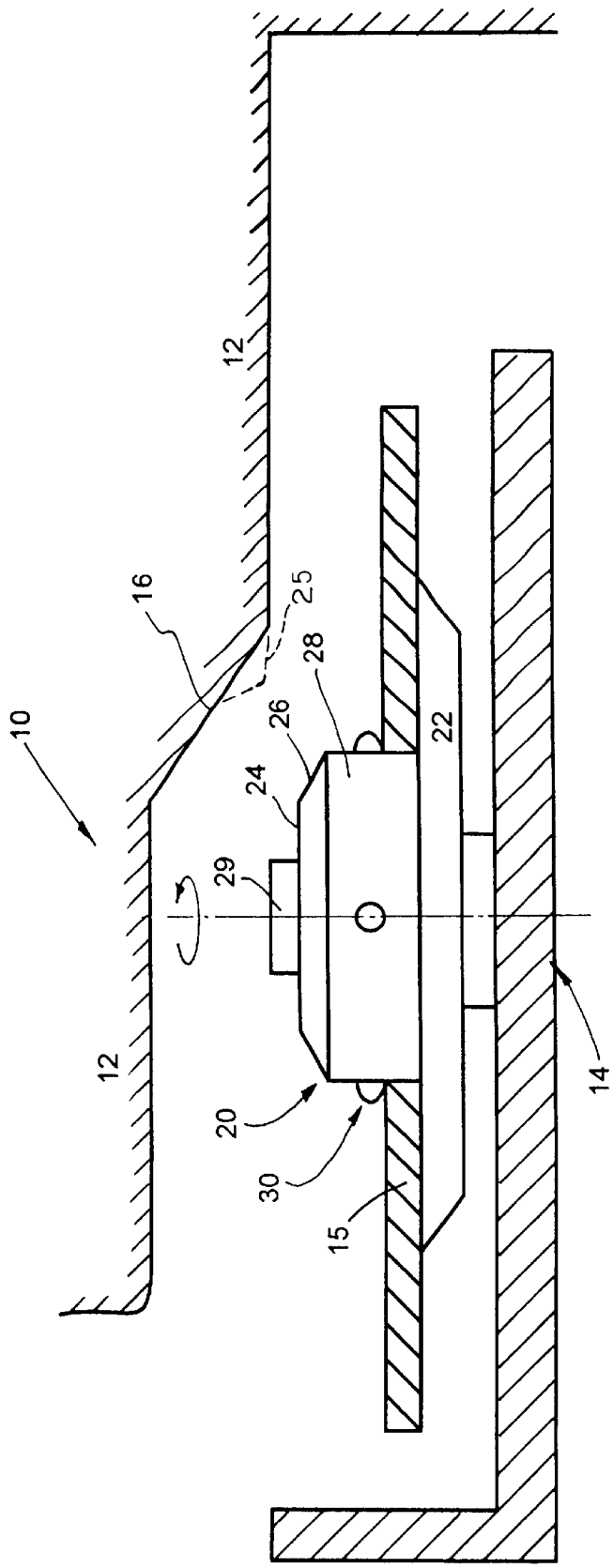
FIG. 1 is an elevational view of an automatic disc clamping embodiment used in laptop style CD players.

FIG. 1 is an elevational view of one embodiment of this invention for use in laptop style CD players 10. FIG. I shows a main drive housing 12, a slidably mounted disc receiving structure 14, and a disc 15. The main drive housing 12 has a first contact surface 16 that may be angled or transverse with respect to the horizontal. The disc receiving structure 14 has a central hub 20 that is coaxial with a flat rotatable surface 22, such as a turntable, extending horizontally around the hub 20 for receiving and supporting a disc 15. The hub 20 has a flat top surface 24, a conical centering surface 26, a generally cylindrical side surface 28. The hub 20 also has a movable second contact surface 29 operably connected to a clamp 30 located inside the hub 20.

A user wishing to use the player 10 first removes the disc receiving structure 14 from the main drive housing 12. One embodiment would require that the user to press a button (not shown), which releases a locking mechanism (not shown) that holds a spring-loaded disc receiving structure 14 in the main drive housing 12. The user would then generally align a central opening of the disc 15 over the top surface 24 of hub 20 and release the disc. As the disc 15 drops onto the rotatable surface 22, the centering surface 26 aligns the disc's axis of rotation with the rotatable surface's axis of rotation.

The user then pushes the disc receiving structure 14 back into the main drive housing 12. The relative motion between the main drive housing 12 and the disc receiving structure 14 causes the first contact surface 16 to contact and to engage the second contact surface 29. Further relative motion forces the second contact surface 29 toward the rotatable surface 22 (i.e., in a downward direction as depicted in FIG. 1). As will be described in more detail in reference to FIGS. 4–6, depressing the second contact surface causes at least one clamping member to engage the disc 15 and to securely hold it against the rotatable surface 22.

A user wishing to unload the disc 15 from the player 10 first removes the disc receiving structure 14 from the main drive housing 12. The resulting relative motion causes the first contact surface 16 to slide relative to and then disengage from the second contact surface 29. As will be described in more detail in reference to FIGS. 4–6, this relative motion actuates the clamp 30 and releases the disc 15. The user can then grip the disc 15 by its periphery and remove it from the rotatable surface 22 without having to overcome any clamping force. After removing the disc 15 from the disc receiving structure 14, the user can load a new disc 15 or can push the disc receiving structure 14 back into the main drive housing 12. No additional steps or disc removal forces are necessary.

The first contact surface 16 can optionally include an over-center indicator 25, such as the protrusion shown with phantom lines in FIG. 1. This indicator 25 works in conjunction with a spring (not shown) to signal the user when the disc receiving structure 14 is adequately inserted into the main drive housing 12. A user pushing the disc receiving structure 14 into the housing 12 should feel a slow increase in force as the second contact surface 29 slides past the indicator 25, followed by a sudden decrease in force when the second contact surface 29 clears the indicator. This feature may increase the perceived quality of the player 10 and may prevent any damage caused by over-inserting the disc receiving structure 14. Other indicators 25 that signal when the disc receiving structure 14 is fully inserted are within the scope of this invention. For example, the protrusion shown in this embodiment could be integrated into the slidable mounts (not shown) that connect the disc receiving structure 14 to the main drive housing 12.

Figure 2:
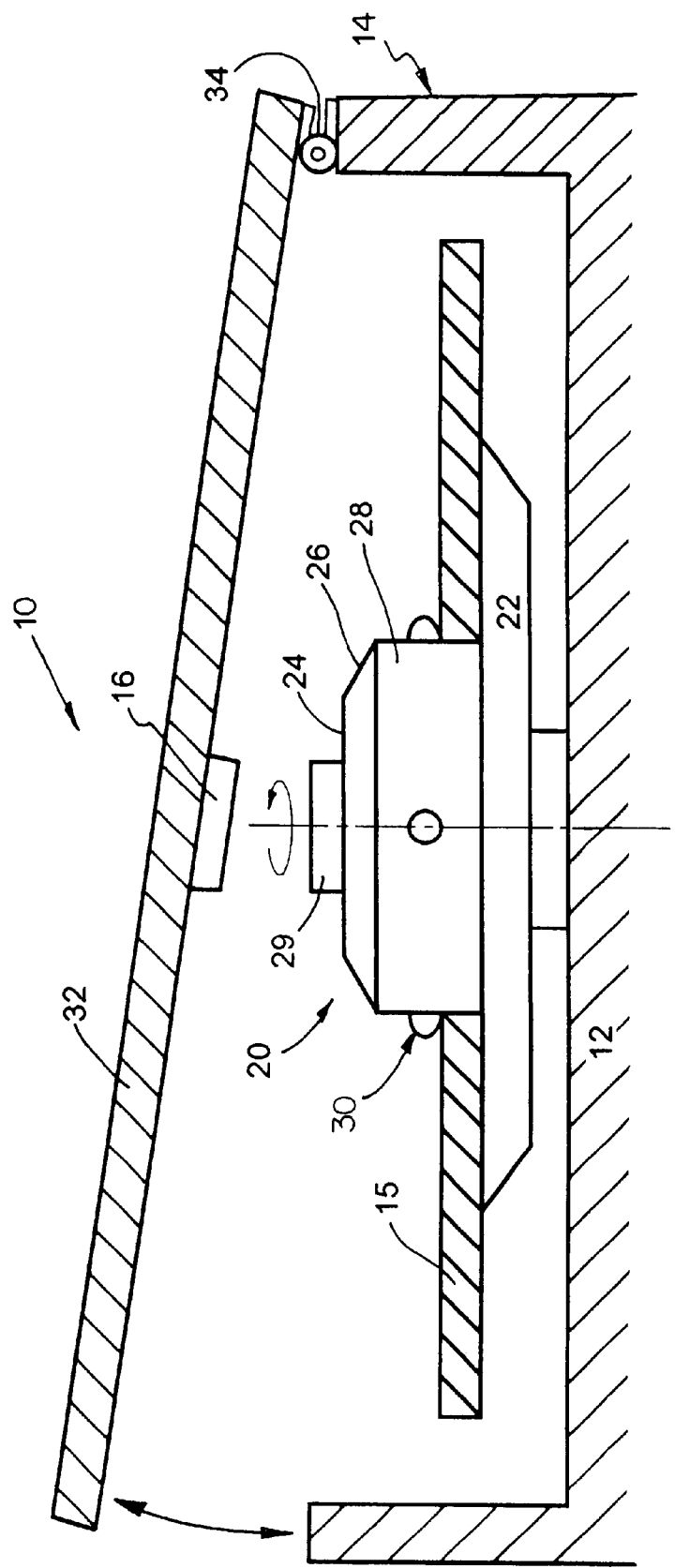
FIG. 2 is an elevational view of an automatic disc clamping embodiment used in top loading style CD players.

FIG. 2 shows a second embodiment of the present invention for use in a top loading style CD player 10. This style of player 10 is comprised of a main drive structure 12 having a lid 32 pivotally connected by a hinge 34. The main drive structure 12 is also comprised of a disc receiving structure 14 having a flat rotatable surface 22, such as a turntable, with a coaxial hub 20. The hub 20 has a generally flat top surface 24, a conical centering surface 26, and a generally cylindrical side surface 28. A protruding first contact surface 16 is mounted to the lid 32 and is generally aligned with (when lid 32 is closed) a second contact surface 29 associated with the hub 20. The second contact surface 29 is operably connected to a clamp 30 located inside the hub 20.

A user wishing to load a disc 15 into this embodiment first opens the lid 32. The user then aligns the disc's center hole over the top surface 24 and releases the disc 15. As in the previously described embodiment, the centering surface 26 aligns the disc 15 with the rotatable surface's axis of rotation as the disc 15 drops onto the rotatable surface 22. The user may then close the lid 32. The resulting relative motion causes the first contact surface 16 to contact, engage, and depress the second contact surface 29, which actuates the clamp 30. A user wishing to unload disc 15 from this embodiment only needs to open the lid 32. This disengages the first contact surface 16 from the second contact surface 29 and releases clamp 30. No additional force or steps are required to clamp or release the disc 15.

Figure 3:
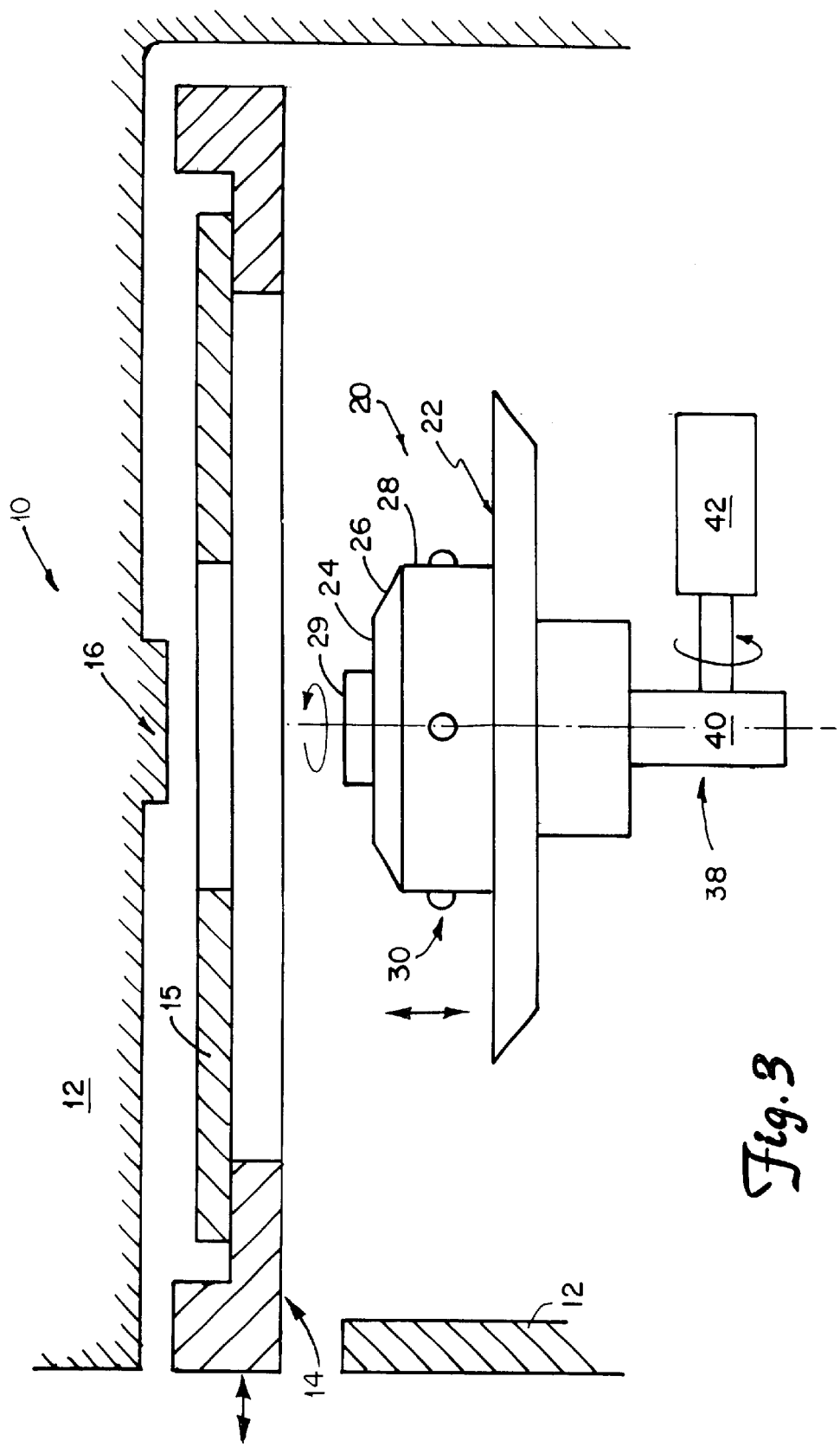
FIG. 3 is an elevational view of an automatic disc clamping embodiment used in tray loading style CD players.

FIG. 3 depicts a third embodiment of the present invention for use in a tray or slot loading style CD player 10. FIG. 3 shows a main drive housing 12, a slidably mounted disc receiving structure 14, and a disc 15. The main drive housing 12 has a protruding first contact surface 16, a spindle lifter 38, a hub 20, and a flat rotatable surface 22. The hub 20 is generally coaxial with the rotatable surface 22 and has a flat top surface 24, a conical centering surface 26, a generally cylindrical side surface 28, and a moveable second contact surface 29. The second contact surface 29 is operably connected to a clamp 30 located inside the hub 20.

A user wishing to load a disc 15 into this embodiment first removes the disc receiving structure 14 from the main drive housing 12. One embodiment requires that the user press a button (not shown), which signals an electric motor or actuator (not shown) to bias the disc receiving structure 14 from the main drive housing 12. The user then drops the disc 15 onto the disc receiving structure 14 and pushes the disc receiving structure 14 back into the main drive housing 12. This action signals the spindle lifter 38 to push the hub 20 and the rotatable surface 22 into contact with disc 15. This relative motion between hub 20 and main drive housing 12 causes the first contact surface 16 to engage the second contact surface 29, which actuates the clamp 30. When the user wishes to unload the disc 15, the user signals the spindle lifter 38 to lower the hub 20 and the rotatable surface 22. The resulting relative motion separates the first contact surface 16 and the second contact surface 16, which releases the clamp 30. The user can then depress a button (not shown) to remove the disc receiving structure 14 from the housing 12.

The spindle lifter 38 in this embodiment can be any device capable of moving the hub 20 and the rotatable surface 22 into contact with the disc 15. One suitable mechanism is a cam 40 eccentrically connected to a position controlled motor 42. The motor 42 turns the cam 40, which pushes the hub 20 and the rotatable surface 22 into contact with the disc 15. Variations of this lifting apparatus are within the scope of this invention. For example, the cam 40 and the motor 42 could be replaced by a linear actuator or a power screw (not depicted).

Figure 4:
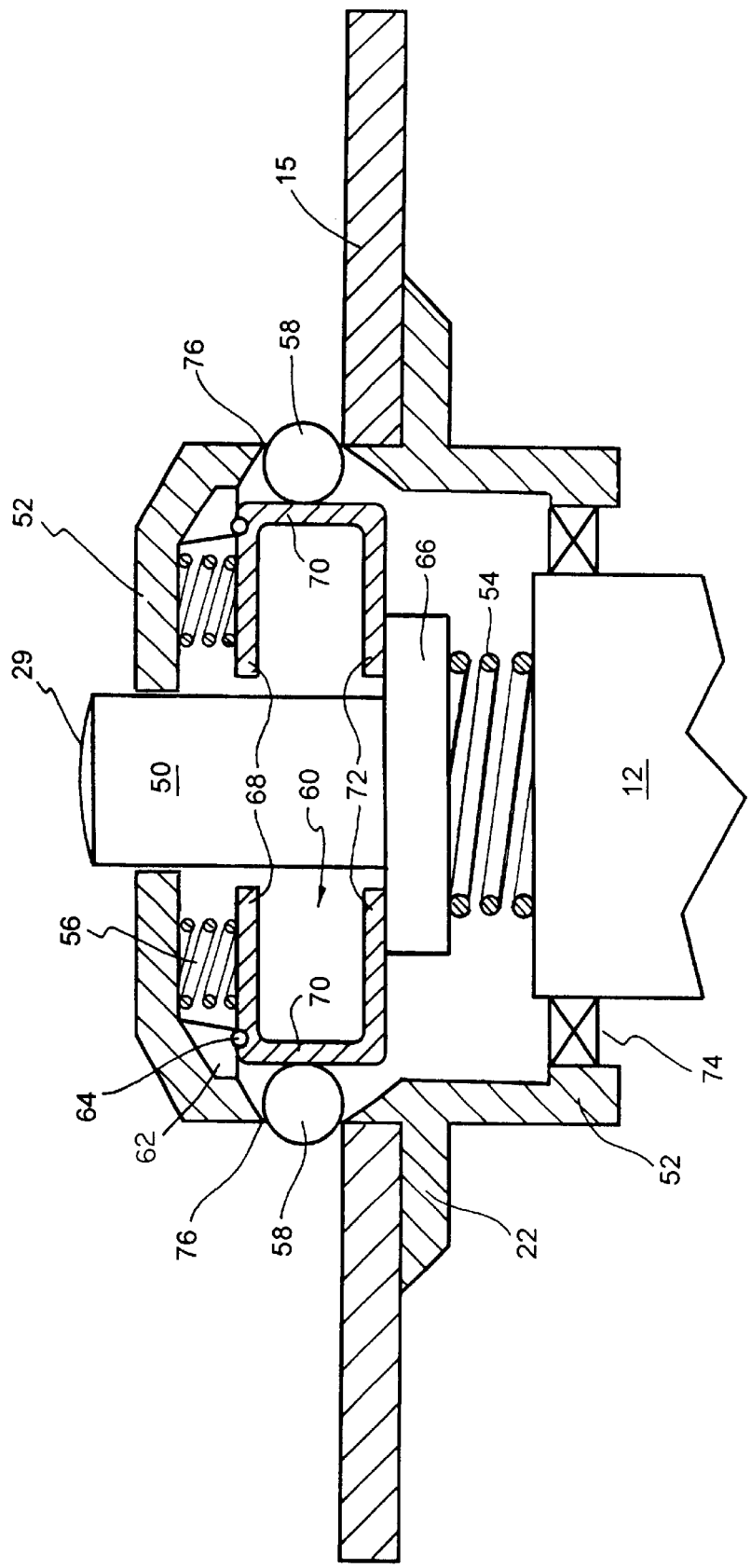
FIG. 4 is a sectional view of a first clamp embodiment.

FIG. 4 is a sectional view of one clamp 30 embodiment suitable for use with the automatic clamp actuating method and apparatus of the present invention. This embodiment comprises a generally cylindrical actuator rod 50, a hollow hub housing 52, a main drive housing 12, a release spring 54, an actuator spring 56, and a plurality of generally spherical clamping members 58. Each clamping member 58 is associated with a U-shaped biasing member 60, which is pivotally connected to the hub housing 52 by a mounting bracket 62 and a pin 64. One end of the actuator rod 50 serves as a second contact surface 29. The opposite end of the actuator rod 50 has a round, coaxial flange 66. The U-shaped biasing member 60 has an upper arm 68, a middle arm 70, and a lower arm 72. A friction-reducing support 74, such as a roller-element bearing, is placed between the hub housing 52 and the main drive housing 12.

A disc 15 may be locked into place on the rotatable surface 22 by depressing the actuator rod 50. This causes the flange 66 to disengage from the U-shaped biasing member 60. Actuator spring 56 then pivots the U-shaped biasing member 60 around pin 64, which causes the middle arm 70 to rotate in a radially outward direction (i.e., clockwise for the U-shaped biasing member depicted on the left side of the FIG. 4 and counterclockwise for the U-shaped biasing member depicted on the right side of FIG. 4). The middle arm 70, in turn, biases its associated clamping member 58 through an opening 76 in the hub housing 52. These openings 76 are dimensioned so that clamping members 58 can protrude slightly from hub housing 52, but cannot fall out. The protruding clamping members 58 apply an axially downward force the disc 15. This force securely holds the disc 15 against the rotatable surface 22.

Releasing actuator rod 50 (i.e., disengaging the first contact surface 16 from the second contact surface 29 so that actuator rod 50 can move axially upward) allows release spring 54 to push the flange 66 into contact with the lower arm 72 of the U-shaped biasing member 60. The force from the release spring 54 against the lower arm 72 will overcome the force from the actuator spring 56 against the upper arm 68 and will cause the middle arm 70 to pivot radially inward. This motion removes the axially downward force from the disc 15, which releases clamp 30.

The hub housing 52 in this embodiment is attached to the rotatable surface 22 and rotates during use. This is desirable because a centripetal force will act on the clamping members 58 and the U-shaped biasing members 60, which can increase the mechanism's clamping force. The actuator rod 50, however, does not rotate during disc play. This feature is desirable because it reduces friction. That is, there would be frictional losses between the first contact surface 16 and the second contact surface 29 if the actuator rod 50 rotated with disc 15. Friction-reducing support 74 further reduces frictional losses by isolating the rotating parts from the stationary parts.

The clamping apparatus shown in this embodiment has four spherical clamping members 58 that are radially spaced around the hub housing 52. The number of clamping members 58 and their orientation is arbitrary. In some embodiments, the use of at least three equally spaced clamping members will be desirable because they will constrain the disc 15 in all directions. Other shaped clamping members are within the scope of this invention. For example, the spherical clamping members 58 in this embodiment could be replaced cylindrical rollers or radially oriented fingers. Although the clamping members 58 depicted in FIG. 4 move in a primarily radial direction, it is also possible to use clamping members 58 that are moveable in an axial direction.

The U-shaped biasing member 60 depicted in this embodiment is desirable due to its low weight and its relatively simple cross section. However, other biasing members 60 capable of interacting with the actuator rod 50, the actuator spring 56, and the clamping members 58 are within the scope of this invention. This includes, without being limited to, a solid or thin-walled member having a rectangular or triangular cross-section.

Figure 5:
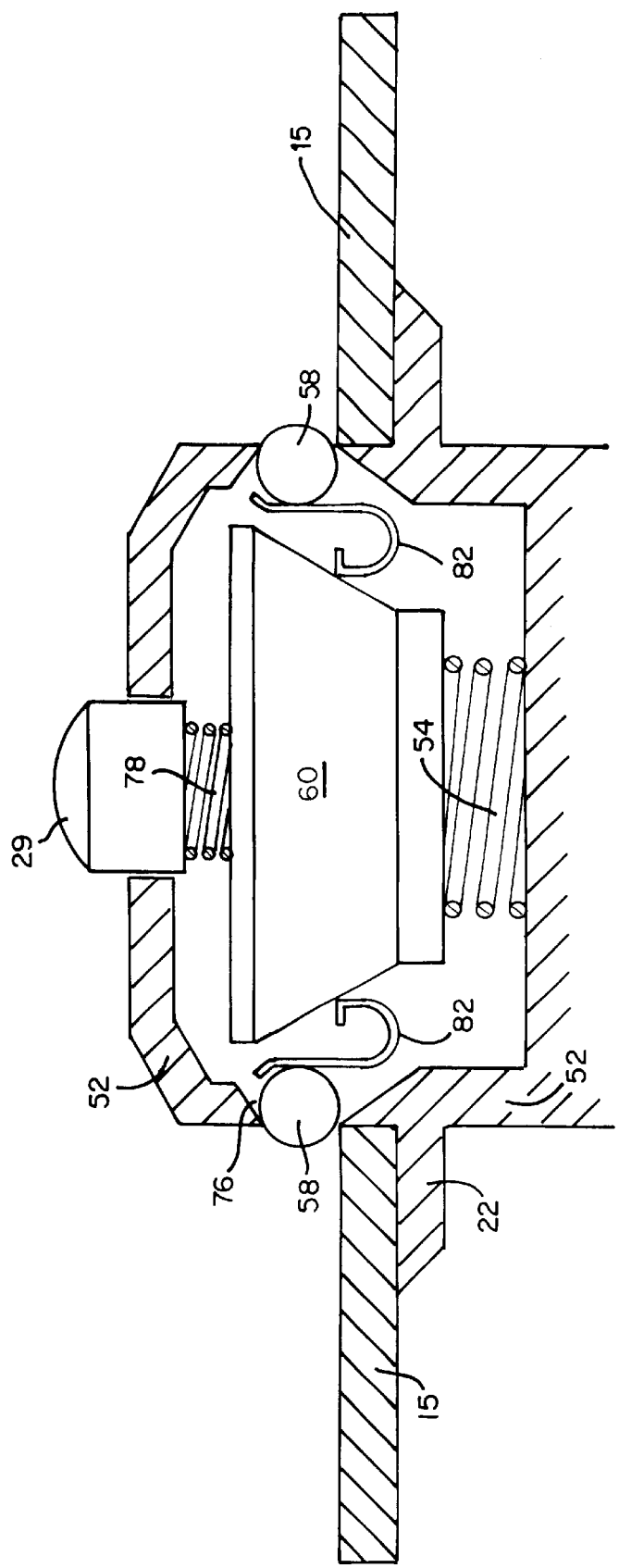
FIG. 5 is a sectional view of a second clamp embodiment.

FIG. 5 is a sectional view of a second clamp 30 embodiment. This embodiment comprises a second contact surface 29, an over-travel spring 78, a conical biasing member 60, a return spring 54, and a follower 82, and a plurality of clamping members 58 generally arranged around a hollow hub housing 52. Contacting and depressing the second contact surface 29 will cause the conical biasing member 60 to bias follower 82 radially outward. The follower 82, in turn, forces its associated clamping member 58 radially outward through openings 76 in the hub housing 52. As discussed in the previous embodiment, these openings 76 allow the clamping members 58 to protrude from hub housing so that they can hold the disc 15 against the rotatable surface 22. Releasing the second contact surface 29 allows the return spring 54 to bias the conical biasing member 60 away from the rotatable surface 22. This releases the radial outward force on clamping members 58 and allows the disc 15 to be easily lifted off the rotatable surface 22.

Follower 82 can be any device that transmits the radial outward force, resulting from movement of the conical biasing member 60, to clamping members 58. One such device is a leaf spring. The leaf spring depicted in FIG. 5 is desirable because it compensates for wear and for thermal expansion. This feature may allow the manufacturer to specify looser tolerances and may improve reliability. Other solid or compliant members capable of interacting with the conical biasing member 60 and the clamping members 58 are within the scope of this invention. The follower 82 can even be eliminated completely. The conical biasing member 60 would then transmit the radial outward force directly to the clamping members 58.

Over-travel spring 78 is an optional device that allows for relative motion between second contact surface 29 and conical biasing member 60. The over-travel spring 78 reduces any shock that occurs when the first contact surface 16 contacts the second contact surface 29. The over-travel spring 78 can also reduce the problems associated with manufacturing inaccuracies and tolerance "stack-up," particularly in embodiments where several parts separate the second contact surface 29 from the main drive housing 12. These benefits allow the manufacturer to use lighter, cheaper parts and to specify looser tolerances. Over-travel springs 78 are particularly desirable for use in a top loading disc players 10, like that shown in FIG. 2, because the user typically closes the lid 32 manually.

Unlike the embodiment shown in FIG. 4, the second contact surface 29 in FIG. 5 rotates during use. This means friction will be generated between the first contact surface 16 and the second contact surface 29. One way of reducing friction is to make both contact surfaces from a hard, smooth material and to give the contact surfaces a generally hemispheric shape. These features help provide for a substantially point-to-point contact between the first contact surface 16 and the second contact surface 29. Other contact surface shapes, such as pointed curves or steps, or other friction reducing methods, such as lubrication or thrust bearings, may also be used in the present invention.

Figure 6:
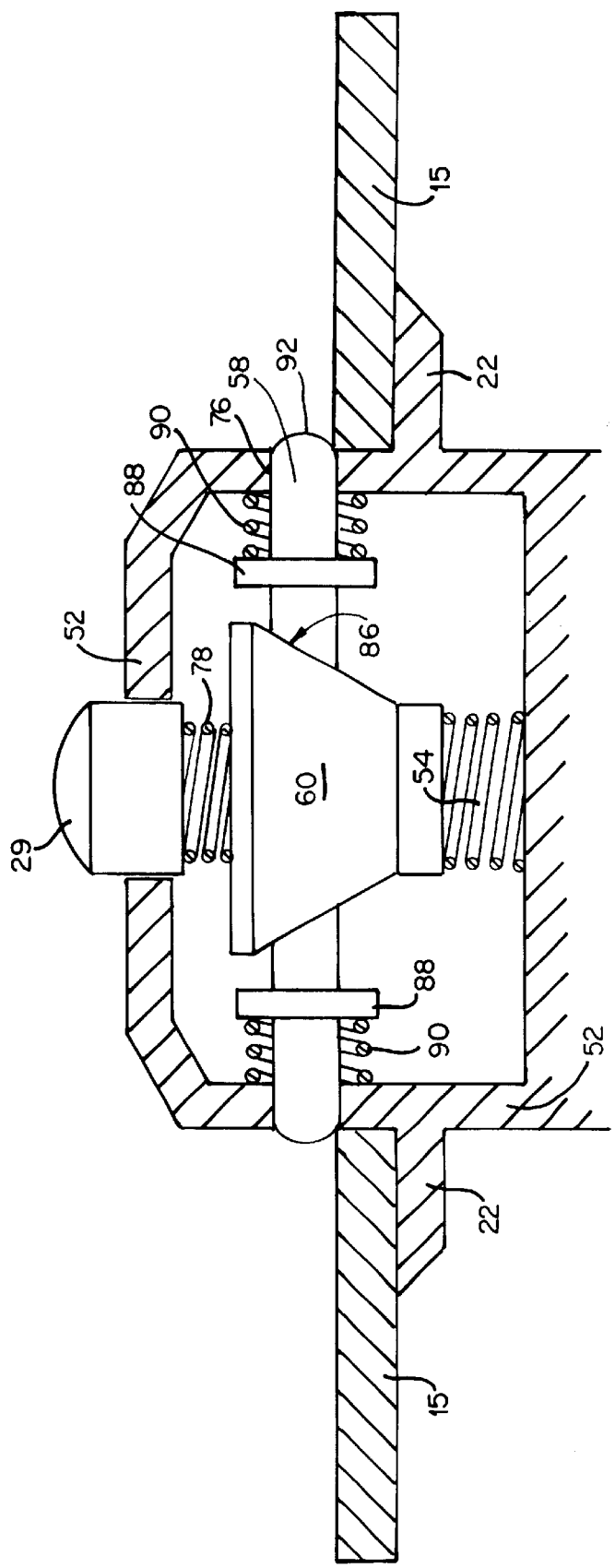
FIG. 6 is a sectional view of a third clamp embodiment.

FIG. 6 shows a third clamp 30 embodiment. This embodiment comprises a hollow hub housing 52 containing a generally hemispheric second contact surface 29, an over-travel spring 78, a conical biasing member 60, a return spring 54, and a plurality of "radial finger" style clamping members 58. Each clamping member 58 has an angled follower surface 86, a circular flange 88, an optional release spring 90, and a generally hemispherical or angled protruding end 92.

Depressing the second contact surface 29 causes the conical biasing member 60 to engage the follower surfaces 86 and to bias the protruding ends 92 radially outward through openings 76 in hub housing 52. This, in turn, compresses the optional release springs 90 located between the flange 88 and the hub housing 52. The protruding ends 92 engage the top corner of the disc's center hole, which holds the disc 15 against the rotatable surface 22. Releasing the second contact surface 29 allows the return spring 54 to push the conical biasing member 60 away from rotatable surface 22. This motion allows the optional release springs 90 to bias the protruding ends 92 back into the hub housing 52.

The present invention offers many advantages over the known clamp actuating devices. The present invention requires fewer parts and is less complex design than current clamping devices. This may reduce manufacturing costs, allow the manufacturer to use cheaper parts, and permit more favorable manufacturing tolerances. The present invention is also desirable from a customer's viewpoint because it is simple to use and because it reduces the risk of damage to both the disc and the player.

Although the present invention has been described in detail with reference to certain embodiments thereof, variations are possible. For example, differently shaped clamping members could be substituted for the generally spherical or radial finger clamping members 58 depicted in FIGS. 4–6. In addition, other clamps 30 capable of being actuated by the normal loading and unloading of a disc are possible. These clamps would not need to be located within the hub 20. One such embodiment would configure the clamping members 58 to engage the disc 15 near its outer periphery. This embodiment may also move the second contact surface 29 away from the top surface 24 of the hub 20. Therefore, the present invention may be embodied in other specific forms without departing from the essential spirit or attributes thereof. It is desired that the embodiments described herein be considered in all respects as illustrative, not restrictive, and that reference be made to the appended claims for determining the scope of the invention.

What is claimed is:

1. A method of actuating a disc clamping assembly of a disc player, the method comprising the steps of:

providing first and second contact surfaces associated with a disc player;

whereby loading a disc brings the contact surfaces into contact, which causes the disc clamping assembly to clamp the disc; and whereby unloading the disc separates the contact surfaces, which causes the disc clamping assembly to release the disc;

providing at least one clamping member operably connected to the second contact surface, each at least one clamping member being disposed in a hub housing of the clamping assembly; and biasing the at least one clamping member into engagement with the disc by engaging each at least one clamping member with a respective pivotably mounted biasing member.

2. The method of claim 1, further comprising the steps of:
opening a lid;
placing the disc on a rotatable surface; and
closing the lid.

3. The method of claim 1, further comprising the steps of:
loading the disc into the disc receiving structure without having to overcome a clamping force; and
unloading the disc from the disc receiving structure without having to overcome a clamping force.

4. The method of claim 1, further comprising the step of:
moving the first contact surface relative to the second contact surface while the first and second contact surfaces are in contact with one another.

5. A method of actuating a disc clamping assembly of a disc player, the method comprising the steps of:
providing first and second contact surfaces associated with a disc player, whereby loading a disc brings the contact surfaces into contact, which causes the disc clamping assembly to clamp the disc, and whereby unloading the disc separates the contact surfaces, which causes the disc clamping assembly to release the disc;
removing a disc receiving structure from the disc player;
placing the disc in the disc receiving structure; and
inserting the disc receiving structure and the disc into the disc player.

6. A method of actuating a disc clamping assembly of a disc player, the method comprising the steps of:
providing first and second contact surfaces associated with a disc player, whereby loading a disc brings the contact surfaces into contact, which causes the disc clamping assembly to clamp the disc, and whereby unloading the disc separates the contact surfaces, which causes the disc clamping assembly to release the disc; and
applying a force to the second contact surface by moving the first contact surface relative to the second contact surface in a direction disposed at an angle to the direction of the applied force.

7. The method of claim 6, further comprising the step of:
releasing the force on the second contact surface by moving the first contact surface relative to the second contact surface.

8. A method of clamping a disc to a turntable, comprising:
providing a main drive structure having a first contact surface;
providing a hub housing comprising a plurality of clamping members and a second contact surface, the plurality of clamping members being operably connected to the second contact surface;
loading a disc onto the turntable such that the hub housing engages an interior edge of the disc; and
applying a force to the second contact surface by moving the first contact surface relative to the second contact surface while the first contact surface and the second contact surface are in contact with one another, wherein the force causes the plurality of clamping members to engage the disc.

9. An apparatus for automatically clamping a disc in a disc playing device, comprising:
a disc receiving structure adapted to be moveable into and out of a disc playing, device; and
a clamp configured to be actuated by contact between the disc receiving structure and the disc playing device, the contact being caused by relative motion between the disc receiving structure and a component of the disc playing device as the disc receiving structure moves into the disc playing device.

10. The apparatus of claim 9, wherein the contact is caused by loading the disc into the disc playing device.

11. The apparatus of claim 9, wherein the clamp comprises:
at least one clamping member; and
a biasing member that causes the at least one clamping member to engage the disc when a force is applied to a contact surface.

12. The apparatus of claim 11, wherein the at least one clamping member engages the disc through an opening in a hub housing.

13. The apparatus of claim 11, wherein the biasing member is conically shaped.

14. The apparatus of claim 11, wherein the biasing member has a U-shaped cross-section.

15. The apparatus of claim 11, wherein the biasing member has a rectangular cross-section.

16. The apparatus of claim 11, wherein the biasing member biases the at least one clamping member in a radially outward direction.

17. The apparatus of claim 11, further comprising a return spring that causes the at least one clamping member to release the disc when the force is removed from the contact surface.

18. The apparatus of claim 11, wherein the contact surface is rotationally fixed with respect the disc playing device.

19. The apparatus of claim 11, wherein the contact surface is associated with the disc receiving structure of the disc playing device.

20. The apparatus of claim 11, wherein the clamp further comprises an over-travel spring that absorbs shock when the force is applied to the contact surface.

21. The apparatus of claim 11, wherein the clamp further comprises an over-travel spring that compensates for manufacturing inaccuracies.

22. The apparatus of claim 9, wherein the disc receiving structure is comprised of a hub that engages the disc when the disc is placed in the disc receiving structure.

23. An apparatus for automatically clamping a disc to a turntable, comprising:
a turntable for receiving a disc, the disc having an interior edge that defines a centrally disposed hole and the turntable having a turntable axis;
a hub housing, coaxial with the turntable axis, that engages the interior edge of the disc when the disc is placed on the turntable; and
a clamping mechanism associated with the hub housing, the clamping mechanism comprising:
a contact surface associated with the hub housing;
at least one clamping member operably connected to the contact surface and moveable into engagement with the disc through an opening in the hub housing; and a pivotably mounted biasing member that biases the clamping member into engagement with the disc when a force is applied to the contact surface.

24. An apparatus for automatically clamping a disc to a turntable, comprising:

a turntable for receiving a disc, the disc having an interior edge that defines a centrally disposed hole and the turntable having a turntable axis;

a hub housing, coaxial with the turntable axis, that engages the interior edge of the disc when the disc is placed on the turntable; and a clamping mechanism associated with the hub housing, the clamping mechanism comprising:

a contact surface associated with the hub housing;

at least one clamping member operably connected to the contact surface and moveable into engagement with the disc through an opening in the hub housing;

a biasing member that biases the clamping member into engagement with the disc when a force is applied to the contact surface; and at least one bias follower, each bias follower being engageable with a respective clamping member and an exterior surface of the biasing member, the biasing member being moveable within the hub housing and its exterior surface being shaped so as to move the at least one bias follower as the biasing member moves within the hub housing.

25. An apparatus for automatically clamping a disc to a turntable, comprising:

a turntable for receiving a disc, the disc having an interior edge that defines a centrally disposed hole and the turntable having a turntable axis;

a hub housing, coaxial with the turntable axis, that engages the interior edge of the disc when the disc is placed on the turntable; and a clamping mechanism associated with the hub housing, the clamping mechanism comprising:

a contact surface associated with the hub housing;

at least one clamping member operably connected to the contact surface and moveable into engagement with the disc through an opening in the hub housing; and a biasing member disposed within the hub housing and adapted to move through the hub housing and to bias the at least one clamping member into engagement with the disc when a force is applied to the contact surface, the biasing member having a conical exterior surface engageable with the at least one clamping member to radially move the at least one clamping member.

\* \* \* \* \*

UNITED STATES PATENT AND TRADEMARK OFFICE
CERTIFICATE OF CORRECTION

PATENT NO.     : 6,252,843 B1
DATED          : June 26, 2001
INVENTOR(S)    : Paul V. Begley et al.

It is certified that error appears in the above-identified patent and that said Letters Patent is hereby corrected as shown below:

<u>Column 10,</u>
Line 8, after "playing" delete ","

Signed and Sealed this

Third Day of December, 2002

JAMES E. ROGAN
*Director of the United States Patent and Trademark Office*